United States Patent [19]

Allen et al.

[11] Patent Number: 4,553,748

[45] Date of Patent: Nov. 19, 1985

[54] ELECTROSTATICALLY ENHANCED GAME

[76] Inventors: Ray L. Allen, 204 Townsend Pl., Atlanta, Ga. 30327; N. Cole Harrison, 1438 Tullie Rd., Atlanta, Ga. 30329

[21] Appl. No.: 517,465

[22] Filed: Jul. 26, 1983

[51] Int. Cl.⁴ ............................................. A63F 9/00
[52] U.S. Cl. ............................... 273/1 E; 273/85 G; 273/DIG. 28; 361/232; 446/140
[58] Field of Search .................... 273/311, 1 E, 1 GC, 273/85 G, DIG. 28; 128/783, 419 N, 419 R, 371, 375; 361/232; 446/140

[56] References Cited

U.S. PATENT DOCUMENTS

| | | |
|---|---|---|
| 477,975 | 6/1892 | Waite ................................. 128/783 |
| 2,404,653 | 7/1946 | Plebanek . |
| 3,819,108 | 6/1974 | Jordan . |
| 4,093,232 | 6/1978 | Nutting et al. ................. 273/121 A |
| 4,149,716 | 4/1979 | Scudder . |
| 4,320,901 | 3/1982 | Morrison et al. . |

FOREIGN PATENT DOCUMENTS 2637250 2/1978 Fed. Rep. of Germany ...... 128/783

Primary Examiner—Richard C. Pinkham
Assistant Examiner—Leo P. Picard
Attorney, Agent, or Firm—Jones & Askew

[57] ABSTRACT

An electrostatic enhancement apparatus for a video arcade or other game, including an electrostatic generator for generating a high voltage low current electrostatic charge, an electrode coupled to the generator for providing the electrostatic charge to a player, and control circuitry responsive to a control signal from the game for actuating the electrostatic generator to provide the electrostatic charge to the player upon the occurrence of a predetermined event in the game. The preferred embodiment includes an isolation booth for surrounding and electrically isolating the player during the electrostatic charging and preventing accidental discharge. Also included is a discharge arm mounted for electrical engagement with the electrode for removing charge from the electrode and the player under certain circumstances.

10 Claims, 4 Drawing Figures

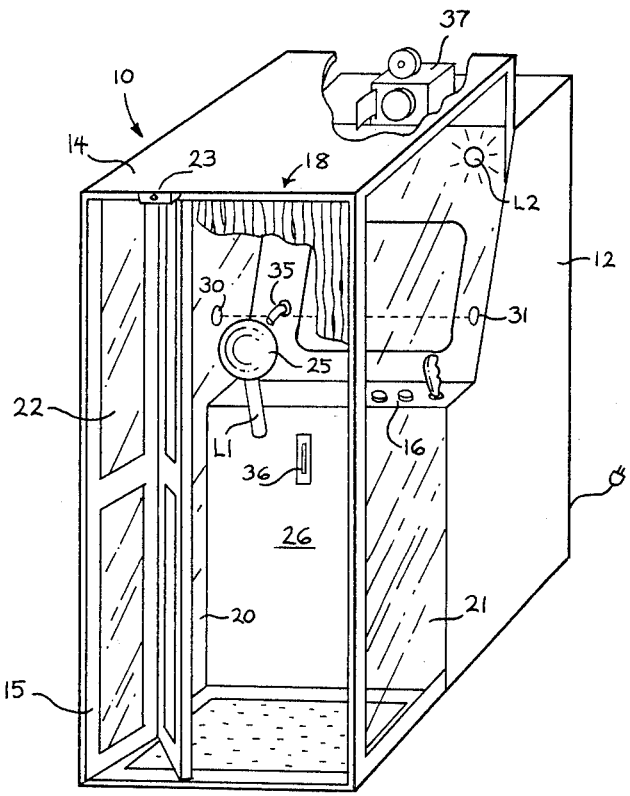
FIG. 1
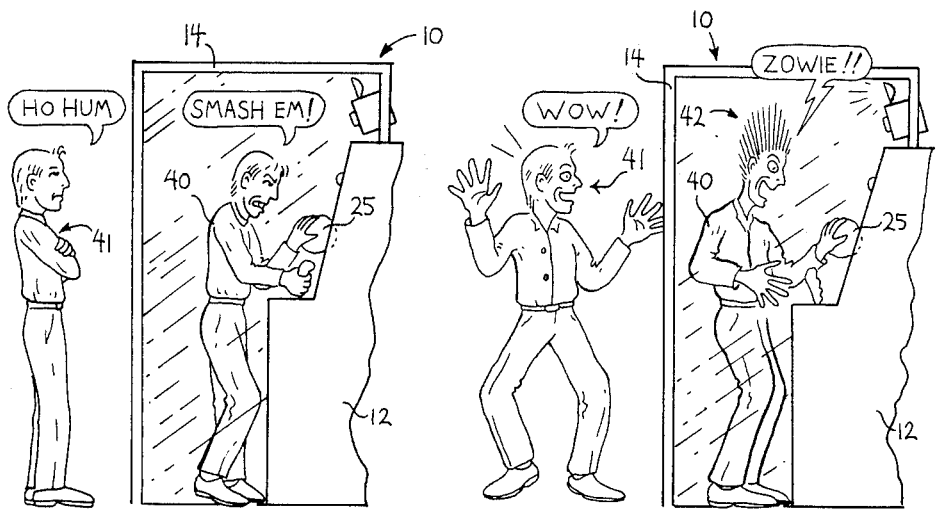
FIG. 2
FIG. 3

ELECTROSTATICALLY ENHANCED GAME

TECHNICAL FIELD

The present invention relates generally to games, and relates more particularly to an electrostatic enhancement for video arcade games.

BACKGROUND

Recent years have seen a proliferation of computer-controlled video arcade games which provide persons seeking entertainment a wide variety of entertaining interactive games premised upon a video display and player interaction. Many of these games are outgrowths of and related to the pinball arcade games, principally electromechanical devices whose popularity has diminished with the rise in popularity of the video arcade games.

Many video and pinball arcade games, and home video games, have as a primary player objective the achievement of a high score. A player, after honing his skills at play, readily discovers that he is able to amaze friends with his reflexes and abilities with repeated play, leading to higher and higher scores as the reward for development of the skills.

Some arcade games provide other types of rewards, such as the provision of additional playing time or the presentation of entertaining interludes of video images and musical passages upon the occurrence of predetermined events. For example, the achievement of a predetermined score in the currently-popular PAC-MAN (trademark) game causes an amusing cartoon image of PAC-MAN characters chasing each other to be presented, accompanied by the recognizable PAC-MAN musical theme tune. Typically, these predetermined events occur at predetermined scoring levels, so that the player can be periodically entertained as he passes through various scoring levels on his way to achievement of his ultimate score in the game.

After a player has achieved a certain skill level, these rather mundane "rewards" may be viewed disdainfully and sometimes annoyingly, as the player tires of the conventional "cartoon and tune" interlude. Prior to the present invention, there has been a dearth of unique and novel rewards or incentives for a skilled player short of these musical tones and video images, or the provision of additional playing time. As the arcade industry has recently become more competitive in seeking to attract players (and their money), there has accordingly developed a need for new, unusual, and player-exciting features.

One attempt to provide player incentive in an arcade-type game is shown in U.S. Pat. No. 2,404,653 to Plebanek, which comprises a shooting gallery-type game. In this game, the player attempts to score points by shooting at a moving rabbit. In the event the player misses the rabbit after the rabbit has moved a predetermined distance, the rabbit pivots towards the player and "fires" back at the player, causing the generation of an unpleasant electrical current to pass through the body of the player, who is holding two electrodes mounted on the handles of the gun. This type device is hazardous not only to the player (since the electrical current passes through the heart) but may also be to observers standing in close proximity to the player, who might receive electrical shocks if they should come into contact with the player. This approach is hazardous and provides a negative incentive in the form of an unpleasant shocking experience to the player (since current passes through the body), rather than a positive incentive.

SUMMARY OF THE INVENTION

The present invention seeks to overcome the disadvantages of prior art electrically shocking arcade games by providing a unique and exciting high voltage low current electrostatic charging of the player in response to a predetermined event. Briefly described, the present invention provides in or for a game such as a video or pinball arcade game, an electrostatic enhancement apparatus which safely and comfortably yet excitingly causes the player's hair to stand on end. The enhancement apparatus comprises an electrostatic generator operative to generate a high voltage low current electrical charge, an electrode coupled to the generator which is contacted by the player and which imparts the electrical charge from the generator to the player, and control circuitry responsive to a control signal from the game for causing the generator to provide the high voltage electrostatic charge to the player. Typically, the control signal from the game will be provided on the occurrence of a predetermined event such as the achievement of a particular score.

Uniquely and thrillingly, the player contacting the electrode will experience a safe high voltage low current static electrical charging, causing the hair to stand on end and providing a unique visual experience for the player and for persons observing the player. Advantageously, no current flows through the body of the player, so that no unpleasant electrical shock is received.

The preferred embodiment includes an electrical isolation booth made of a clear insulating material such as "plexiglas" or the like which surrounds and electrically isolates the player from the surrounding environment so as to prevent accidental discharge of the electrostatic charge. Consequently, the player within the booth remains safe from the passage of electrical current through the body, and the provision of the electrostatic charge merely causes his hair to stand up on end. Advantageously, the isolation booth also prevents the potentially painful discharge of electricity into the bodies of persons observing the player, who can view the hair-raising effect through the clear walls of the isolation booth with safety. Also provided in the preferred embodiment is a safety interlock on the door of the booth, which removes electrostatic charge from the electrode and powers down the electrostatic generator if the door should be opened during operation of the game, preventing exposing the player or observers to electrical shock.

In the preferred embodiment, a discharge arm is mounted for electrical engagement with the electrode so as to safely and quickly remove charge from the electrode, and consequently from the player. The discharge arm is operative to contact with and discharge the electrode upon the occurrence of a second control signal, which in the preferred embodiment can be provided by the game, by the operation of the safety door interlock, or by the player's attempt to remove his hand from the electrode. Accordingly, there is also provided a player sensor for detecting whether the player's person is physically contacting the electrode. If the sensor detects that the player has removed his hand from the electrode during the game, evidencing fear of charging, the player sensor causes the discharge arm to force the electrode to ground potential, preventing the build-up of charge.

Accordingly, it is an object of the present invention to provide a new and exciting enhancement for arcade games.

It is a further object of the present invention to provide an electrostatic enhancement apparatus for video arcade and other games which creates a safe but exciting hair-raising effect.

It is a further object of the present invention to provide an electrostatic enhancement apparatus for games which generates a safe high voltage low current electrostatic charge to a player upon the occurrence of a predetermined event during the play of the game.

It is a further object of the present invention to provide for an arcade game a safe high voltage low current electrostatic charge to a player upon the occurrence of a predetermined event, which charge cannot be accidentally discharged through the body of the player.

It is a further object of the present invention to provide a means for preventing accidental painful and dangerous discharges of electricity through the body of the player or observers by electrically isolating the player from the surrounding environment during the play of the game and during the application of an electrostatic charge.

These and other objects, features, and advantages of the present invention may be more clearly understood and appreciated from a review of the following detailed description of the preferred embodiment and by reference to the appended drawings and claims.

BRIEF DESCRIPTION OF THE DRAWINGS

FIG. 1 is a perspective view of the preferred embodiment of the electrostatic enhancement apparatus of the present invention.

FIG. 2 diagrammatically illustrates a player at an arcade game confined within the isolation booth employed in the preferred embodiment.

FIG. 3 illustrates the effect of the electrostatic charge upon the player shown in FIG. 2, after achievement of a predetermined score.

DETAILED DESCRIPTION OF THE PREFERRED EMBODIMENT

Figure 4:
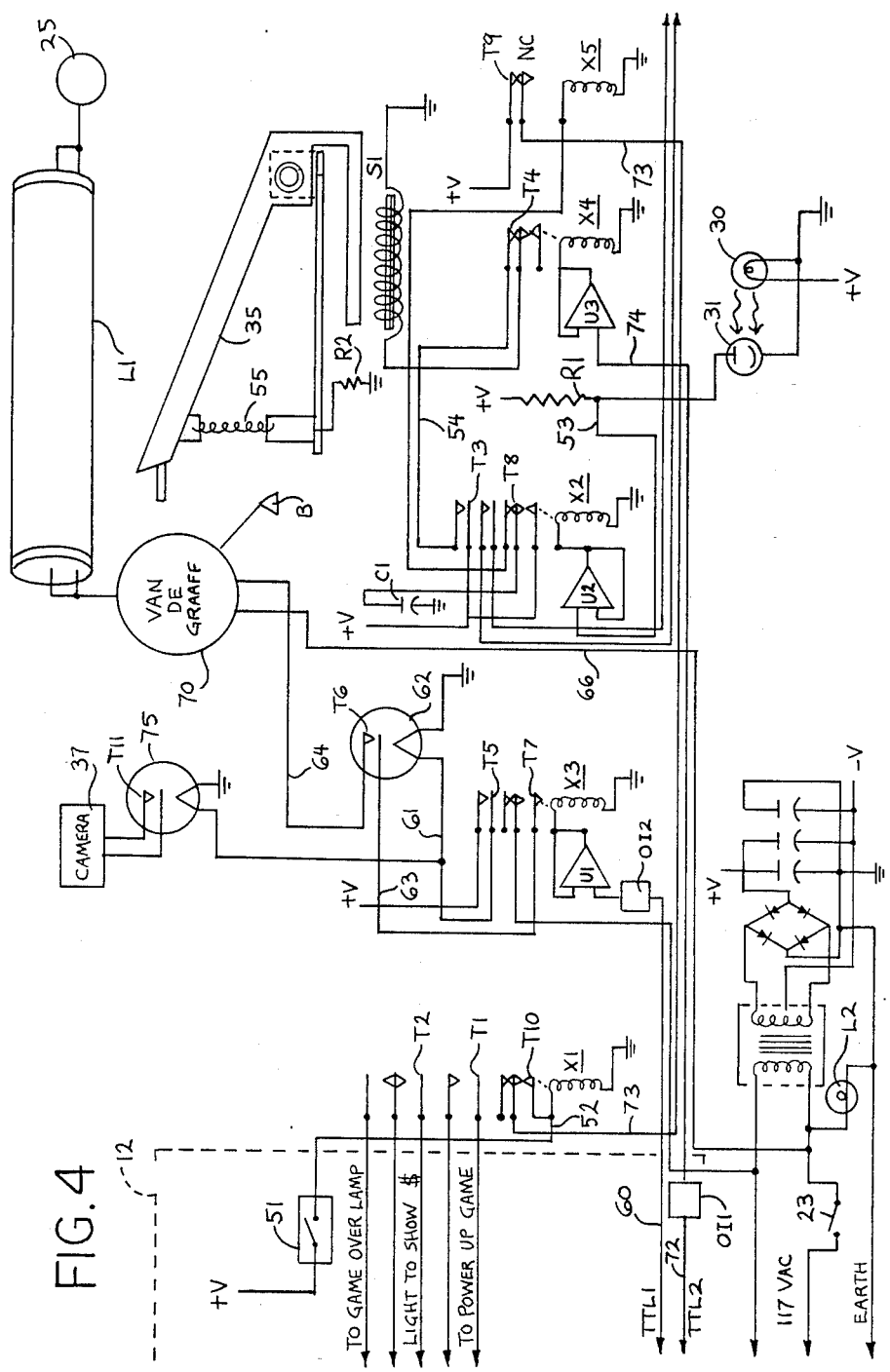
FIG. 4 is a electrical schematic diagram of the circuitry employed in the preferred embodiment.

Referring now to the drawings, in which like numerals indicate like elements throughout the several views, FIG. 1 shows a preferred embodiment of an electrostatic enhancement apparatus 10 constructed in accordance with the present invention. The apparatus can take the form of a retrofit device adaptable to virtually any conventional video or arcade game, or can be integrally constructed with a game especially designed to exploit and promote the electrostatic feature. The enhancement apparatus shown in FIG. 1 is coupled to a conventional video arcade game 12 for provision of the electrostatic charge upon the achievement of a predetermined score in the game. An electrical isolation booth 14 is physically mounted to the video game 12 so as to allow a player to operate the controls 16 of the game. A bi-fold door 15 is attached to the booth and allows player entry to and exit from within the confines of the booth.

Electrically conducting foil strips 18 which are electrically grounded are positioned to hang downwardly over the entryway of the door 15 so as to remove charge from the player upon exit from the booth 14. The foil strips are disposed such that they remain on the exterior of the booth at all times, and do not undesirably extend into the booth during play (when the door 15 is closed).

Preferably, the outer walls 20, 21 of the booth are made of a transparent but electrically insulating material such as "plexiglas" or the like which allows observation of the player within the booth while still effectively electrically isolating the player from the external environment. Additionally, the panels 22 of the door 15 are preferably made of the same transparent electrically insulating material. The floor 19 is preferably an insulating material such as rubber or the like.

A safety interlock switch 23 is provided along the outer periphery of the booth 14 and contacts with an edge of the door 15, so that accidental or deliberate opening of the door during play of the game or during electrostatic charging will immediately power down the electrostatic generator and discharge the electrostatic charge from the player.

Provided within the confines of the booth 14 is a "power base" or electrode 25 for providing the electrostatic charge to the person of the player. Preferably, the electrode is mounted so that the player can easily, conveniently, and comfortably place his hand upon the electrode without assuming awkward positions. Ideally, then, the electrode 25 is placed at approximately waist to chest height and extends slightly outwardly from an outer surface 26 of the game 12. In the preferred embodiment, the electrode is electrically connected to the electrostatic charging circuitry (FIG. 4) via a fluorescent light bulb L1 to provide a visual indication of charging, and which, as known to those skilled in the art, will illuminate during electrostatic charging.

An electric eye comprising light-emitting means 30 such as a lamp, and light detecting means 31 such as a photocell, is mounted to project a beam of light immediately across the surface of the electrode 12 for detection of a player's hand on the electrode. In the preferred embodiment, the electrode 25 is a metallic sphere upon which the player's hand rests in order to receive the electrostatic charging. Accordingly, the light-emitting means 30 should be mounted to transmit a beam of light almost tangent to the surface of the sphere of the electrode 25; the light detecting means 31 then should be mounted on the opposite wall of the booth 14 so as to detect the light emitted by the light-emitting means 30. Placement of the player's hand on the top of the spherical electrode 25 will interrupt the beam of light and thereby provide a control signal to the circuitry described below which prevents charging of the electrode if the player's hand is not contacting the electrode, or which discharges the electrode if the player's hand is removed.

A conventional incandescent light bulb L2 is also provided within the booth to lower the humidity in the booth by radiant heat, so that excess humidity will not cause an inordinately long charging time.

Also shown in FIG. 1 is a safety discharge arm 35 mounted to the game 12. In the preferred embodiment, the discharge arm 35 is grounded and is operative to contact with the electrode 25 to remove charge therefrom under certain circumstances. The discharge arm 35 is preferably spring-loaded and biased toward the electrode 25, and, as will be described in connection with the circuitry, is moved away from the electrode 25 by operation of a solenoid S1 (FIG. 4), so that removal of power or the occurrence of any condition which would require discharge or dissipation of the charge on the electrode deactuates the solenoid, causing the spring to move the discharge arm 35 into contact with the electrode.

A conventional money slot 36 for the game 12 receives coins for the game and provides a control signal via a coin switch 51 (FIG. 4) to the circuitry employed in the preferred embodiment. Deposit of appropriate coins starts the game 12 and enables the provision of the electrostatic charge at the appropriate time.

Also included in the preferred embodiment is a camera 37 positioned above the game and aimed toward the interior of the booth for automatically photographing the player during the provision of the electrostatic charge. Preferably, the camera is an instant-develop type (such as a Polaroid brand), so that the photograph will be ready for the player at the conclusion of the game.

FIG. 2 illustrates a typical video arcade game 12 having the electrostatic game enhancement apparatus 10 of the present invention attached thereto. As seen in FIG. 2, a player 40 is shown at the console of the game 12, with his hand placed on the electrode 25. An outside observer 41 is shown standing immediately adjacent the booth 14 and is able to view the progress of the game played by the player 40.

As shown in FIG. 3, upon the occurrence of the selected predetermined event (typically for a video arcade game such as shown in FIG. 3, the predetermined event will be the achievement of a particular score), an electrostatic charge will be applied to the electrode 25, and provided that the hand of the player 40 is maintained on the electrode, the electrostatic charge will cause the hair 42 of the player 40 to become charged. Since the electrostatic charges provided to the player 40 are of the same polarity, all of the strands of hair 42 will obtain the same charge, so that the individual strands of hair will repel each other and cause the hair to stand on end, as shown in FIG. 3. A photograph of the player may also be taken by camera 37 to provide a souvenir.

Turning now to FIG. 4, there is shown a schematic diagram of the circuitry employed in the preferred embodiment to control the provision of electrostatic charge to the player and the discharge of the charge from the player. Upon entry into the booth 14, the player closes the door 15 (FIG. 1) and faces the controls 16 of the game 12. The player then places appropriate coins in the coin slot 36 (FIG. 1), causing the actuation of a coin switch 51 which connects electrical power on line 52 to the coil of a latching relay X1, which actuates and enables the remainder of the circuitry to operate. Relay X1 when actuated connects electrical power through terminal T1 to power up the game 12, and connects power through terminal T2 to illuminate a lamp on the game to acknowledge receipt of payment. The normally closed contact of terminal T2 is thus opened, extinguishing the "game over" lamp in the game 12 in a conventional manner.

In the preferred embodiment, the deposit of a coin and actuation of relay X1 causes the game to cycle through its initial routine, a part of which in the preferred embodiment instructs the player to place and maintain his hand atop the electrode 25. In the disclosed embodiment, the player must keep his hand on the electrode 25 at all times, continually interrupting the light beam from the light-emitting lamp 30 to the photocell 31; removal of the hand will cause termination of the game. It will of course be appreciated that an alternative embodiment wherein the player is instructed to place his hand on the electrode at a particular point during the play of the game is also contemplated, and may be desirable in certain circumstances such as where the electrostatic charging will only occur for those players who choose to experience it.

Assuming that the player has placed his hand on the electrode 25 per the instructions provided by the game 12, the interruption of the light impinging the photocell 31 maintains a voltage on line 53 from the photocell 31, which is pulled up to a resistor R1 to a positive voltage supply source. Line 53 is connected to one input of an operational amplifier U2, whose output is connected to the coil of a second relay X2. Accordingly, the terminals of relay X2 will be pulled in and held in as long as the player's hand interrupts the light beam, indicating that the player's hand is placed on the electrode 25.

The actuation of relay X2 connects power from a voltage source through the contact T3 to line 54, which is then provided through contacts T4 of a relay X4. The contacts T4 are connected to one terminal of the coil of a solenoid S1 which then actuates, pulling the discharge arm 35 away from the surface of the electrode 25 and holding the discharge arm away from the electrode as long as power is provided to solenoid S1. A spring 55 biases the discharge arm 35 into engagement with the electrode if power should be removed from the solenoid S1. Accordingly, provided that relays X1 and X2 are engaged, solenoid S1 is actuated and lifts the discharge arm 35 away from the electrode 25.

Now that the game enhancement apparatus 10 described herein has been actuated, the player can play the game and score points. Preferably, the joy stick or other controls 16 (FIG. 1) of the game 12 are constructed with non-conductive material such as plastic so as to prevent the transmission of charge into the circuit components of the game 12.

When the player reaches a sufficiently high score, or upon the occurrence of another predetermined event chosen by the programmer or designer of the game 12, electrostatic charging of the player can then occur. In the preferred embodiment, upon the achievement of a sufficiently high score, the game 12 pauses and may display to the player a message such as "STAND BY FOR ULTRA SHOCK" or "HOLD ON TIGHTLY TO POWER BASE". Thereafter, a control signal TTL1 from the game 12 is provided to cause the provision of the electrostatic charging.

The control signal is provided on line 60 from the game 12, which is a conventional TTL level output from the digital game control circuitry. Line 60 is connected through optoisolator OI1 (for additional electrical isolation of the electrostatic charging circuitry from the circuitry of the game) to an input of an operational amplifier U1, whose output is connected to and drives the coil of a relay X3. The actuation of relay X3 closes a set of contacts T5 which connects power from a voltage source to line 61, which is connected to the terminals of a time delay relay tube 62.

In the preferred embodiment, time delay tube 62 is a type 15NC24 which will be understood by those skilled in the art to be a relay-type device which closes a set of contacts for a predetermined time period. The contacts T6 in time delay tube 62 connect line 63 to line 64, which is provided to one terminal of a Van de Graaff electrostatic generator 70. Line 63 is also connected to another terminal T7 of relay X3, which is in turn connected to 117 volts AC on line 65. The other connection to the 117 volts AC line is made through a safety interlock switch 23, one terminal of which is connected on line 66 to the other terminal of the electrostatic generator 70. It will thus be appreciated that opening the door of the booth causes the safety interlock switch 23 to open, immediately removing power from the electrostatic generator 70.

In the preferred embodiment, the electrostatic generator 70 is a conventional Van de Graaff generator commercially available. A dirod electrostatic generator may also be employed. it will be understood that the preferred Van de Graaff electrostatic generator consists essentially of a high-voltage electrode supported on an insulating column (not shown) and of a rapidly moving belt system which carries electrical charge to the output terminal. The provision of power on lines 64 and 66 to the generator 70 causes the drive motor for the belts in the generator to turn the belts for the time period allowed by the time delay tube 62. As will be understood by those skilled in the art, in a few seconds, the static charge on the surface of the generator 70 reaches the order of 20,000 volts or more, depending on relative humidity.

The charge generated by the electrostatic generator 70 in the preferred embodiment is provided through a fluorescent lightbulb L1 to the electrode 25 in order to obtain an additional visual effect. Those skilled in the art will appreciate that the electrostatic charge will illuminate the lamp L1 during the provision of electrostatic charge to the electrode 25. Provided that the player maintains his hand on the electrode 25, electrostatic charge will be safely transferred to the body of the player, causing the hair to stand on end due to the presence of like charges on the individual strands of hair, as shown in FIG. 3.

Should the player become alarmed and remove his hand from the electrode 25, the light beam will be reestablished on the photocell 31, causing amplifier U2 to deactuate relay X2. This in turn will remove power from terminal T3 and line 54, resulting in the deactuation of solenoid S1. Spring 55 will then quickly pull the discharge arm 35 into contact with electrode 25, transferring the charge safely to ground. Preferably, a current path is provided through the discharge arm to ground through a resistive material (indicated by resistor R2) so as to minimize corona discharge. It should also be understood that the discharge arm 35 or another discharge arm can be made to contact with the electrostatic generator 70 directly, still rapidly and effectively discharging the electrode 25.

Further assuming that the player maintains his hand on the electrode 25 during the entire time period provided by time delay tube 62, when the time delay tube times out, power will be removed from the terminals of the electrostatic generator 70 by the opening of terminal T6. Alternatively, a second control signal TTL2 provided on line 72 through optoisolator OI2 from the game 12 causes the discharge of the electrostatic generator 70. The output of optoisolator OI2 is provided on line 74 and connected to the input of a buffer amplifier U3, whose output is connected to the coil of a relay X4. The actuation of relay X4 by the control signal TTL2 opens the contacts T4, similarly causing solenoid S1 to deactuate and allow the discharge arm to discharge the built-up charge on the electrode.

Relay X5 is provided for holding the latching relay X1 latched. When relay X1 activates, power is continually provided to the coil of relay X1 from line 73, which is connected through contacts T9 of relay X5 to a voltage source. If relay X2 deactuates, indicating that the player has removed his hand, terminal T8 will connect capacitor C1 to the coil of relay X5, causing relay X5 to briefly actuate and remove power from the coil of relay X1, releasing the latching. Capacitor C1 charges through terminals T8 while relay X2 is activated.

A second time delay tube 75 is provided whose contacts T11 close a predetermined time after power is connected to line 61 (which occurs upon the actuation of relay X3 when the control signal TTL1 is provided). The terminals T11 of the time delay tube 75 are connected to an instant-developing camera 37 so as to actuate the camera after a predetermined time delay. Preferably, the time delay before actuation of the camera closely corresponds to the time required for the player's hair to stand on end. Accordingly, it will be appreciated that in the disclosed embodiment a picture of the player may be taken at or near the peak of charging, so that the player may receive a souvenir of play. Of course, it will be understood that the camera feature easily can be omitted.

It will now be appreciated that there has been disclosed an electrostatic enhancement apparatus for an arcade or other type game wherein upon the provision of a control signal from the game, on the occurrence of a preselected event in the game, a player in contact with electrode 25 will experience a safe high voltage low current electrostatic charge, causing the player's hair to stand on end. It will be further understood that there has been disclosed means for safely coupling the electrostatic charge to the player by an electrode coupled to an electrostatic generator which may be safely and quickly discharged in the event the player removes his hand from the charging electrode, opens the door to the electrically isolated booth wherein the player stands for play of the game, or upon the occurrence of another preselected event mandating discharge of the player and of the electrostatic charge.

It will finally be understood that the preferred embodiment of the present invention has been disclosed by way of example, and that other modifications may occur to those skilled in the art without departing from the scope and the spirit of the appended claims.

We claim:

1. In an electronic game including game signal means for providing a control signal upon the occurrence of a predetermined event in said game, an electrostatic enhancement apparatus for said game, comprising:
   electrostatic generator means operative to generate a high voltage low current electrical charge upon being provided with power;
   electrode means coupled to said generator means for providing said electrical charge to the person of a player;
   isolation booth means containing said electrode means for surrounding and electrically isolating a player from the surrounding environment and for preventing accidental discharge of said electrical charge; and
   control means responsive to said control signal from said game for providing power to said generator means and for causing said generator means to provide said electrical charge to the player, whereby upon the occurrence of said predetermined event in said game, a player in physical contact with said electrode will experience a safe high voltage low current static electrical charging, causing the player's hair to raise.

2. The apparatus of claim 1, wherein said isolation booth means is constructed of transparent electrically insulating sheet-like panels, thereby allowing safe external observation of the player.

3. The apparatus of claim 2, wherein said panels comprise "plexiglass" panels.

4. The apparatus of claim 1, wherein said booth means includes door means to allow player entry and exit, and further comprising safety interlock switch means for removing power from said generator means and for removing electrical charge from said electrode means if said door is opened during operation of the game.

5. The apparatus of claim 1, further comprising a plurality of electrically conductive foil strips which are electrically grounded and disposed to contact with a player leaving said booth means for removing charge from the player.

6. In an electronic game including game signal means for providing a control signal upon the occurrence of a predetermined event in said game, an electrostatic enhancement apparatus for said game, comprising:
electrostatic generator means operative to generate a high voltage low current electrical charge upon being provided with power;
electrode means coupled to said generator means for providing said electrical charge to the person of a player;
control means responsive to said control signal from said game for providing power to said generator means and for causing said generator means to provide said electrical charge to the player;
electrically grounded discharge arm means mounted for electrical engagement with said electrode means, for grounding and removing charge from said electrode means upon the occurrence of a second control signal; and
player sensor means for detecting whether the player is physically in contact with said electrode means, said sensor means providing said second control signal upon the detection of removal of physical contact by the player with said electrode means,
whereby upon the occurrence of said predetermined event in said game, a player in physical contact with said electrode will experience a safe high voltage low current static electrical charging, causing the player's hair to raise.

7. The apparatus of claim 6, further comprising discharge arm moving means responsive to said second control signal and operative to move said discharge arm means into electrical contact with said electrode means upon the occurrence of said second control signal.

8. The apparatus of claim 6, wherein said second control signal is automatically provided by said game after a predetermined time period.

9. The apparatus of claim 6, wherein said sensor means comprises an electric eye mounted to detect the presence of the player's hand on said electrode means.

10. In an electronic game including game signal means for providing a control signal upon the occurrence of a predetermined event in said game, an electrostatic enhancement apparatus for said game, comprising:
electrostatic generator means operative to generate a high voltage low current electrical charge upon being provided with power;
electrode means coupled to said generator means for providing said electrical charge to the person of a player;
control means responsive to said control signal from said game for providing power to said generator means and for causing said generator means to provide said electrical charge to the player,
whereby upon the occurrence of said predetermined event in said game, a player in physical contact with said electrode will experience a safe high voltage low current static electrical charging, causing the player's hair to raise; and
camera means positioned and operative to photograph the player during electrostatic charging.

* * * * *